United States Patent
Finkelstein et al.

(10) Patent No.: US 11,509,731 B2
(45) Date of Patent: *Nov. 22, 2022

(54) ROBOTIC CLOUD COMPUTING SERVICES ARBITRATION USING ORCHESTRATOR OF ORCHESTRATORS

(71) Applicant: Charles Finkelstein Consulting LLC, Woodinville, WA (US)

(72) Inventors: Charles Finkelstein, Woodinville, WA (US); Ethan Finkelstein, Woodinville, WA (US); Inder Singh, Seattle, WA (US)

(73) Assignee: CHARLES FINKELSTEIN CONSULTING LLC, Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/145,088

(22) Filed: Jan. 8, 2021

(65) Prior Publication Data

US 2021/0136158 A1    May 6, 2021

Related U.S. Application Data

(63) Continuation of application No. 15/716,405, filed on Sep. 26, 2017, now Pat. No. 10,904,344.

(51) Int. Cl.
*H04L 67/51* (2022.01)
*H04L 47/78* (2022.01)
*H04L 67/303* (2022.01)
*G06N 20/00* (2019.01)

(52) U.S. Cl.
CPC ............. *H04L 67/51* (2022.05); *G06N 20/00* (2019.01); *H04L 47/788* (2013.01); *H04L 67/303* (2013.01)

(58) Field of Classification Search
None
See application file for complete search history.

(56) References Cited

U.S. PATENT DOCUMENTS

| | | | |
|---|---|---|---|
| 2010/0217454 A1* | 8/2010 | Spiers | H05K 7/20836 713/320 |
| 2012/0124211 A1* | 5/2012 | Kampas | G06F 9/50 709/226 |
| 2014/0279201 A1* | 9/2014 | Lyoob | H04L 43/062 705/26.7 |
| 2016/0149769 A1* | 5/2016 | Joshi | H04L 41/5006 715/739 |
| 2018/0011689 A1* | 1/2018 | Motamedi | A61B 5/0533 |
| 2018/0302215 A1* | 10/2018 | Salgueiro | H04L 67/22 |
| 2018/0343300 A1 | 11/2018 | Halter et al. | |

OTHER PUBLICATIONS

U.S. Appl. No. 17/145,088, filed Jan. 8, 2021, Charles Finkelstein.

* cited by examiner

*Primary Examiner* — Lance Leonard Barry
*Assistant Examiner* — Mohammad Yousuf A. Mian
(74) *Attorney, Agent, or Firm* — Rowan TELS LLC

(57) ABSTRACT

A system and method for robotically arbitrating cloud computing services utilizes resource parameters, tolerance values, and client system requirements to configure a meta-orchestrator to select a validated compatible service from a service resource pool and employ an orchestrator to migrate a client system to the selected service and utilize block chain technology for logging transactions, storing metadata and data.

12 Claims, 8 Drawing Sheets

ROBOTIC CLOUD COMPUTING SERVICES ARBITRATION USING ORCHESTRATOR OF ORCHESTRATORS

BACKGROUND

The increasing proliferation of cloud service providers and service levels has given rise to an increase in the quality and availability of cloud services. This has created a greater need for organizations to increase the mobility and scalability of their data, compute, networking and applications, relative to service providers, utilizing a "just-in-time" approach to system resource architecture, allocation and service delivery. Currently, a user seeking to increase the efficiency of their deployment of computing resources must manually determine which services exist, their cost, and merits and balance these relative to the hassle and cost of migration. This process presents a great deal of difficulty, and may consume a large amount of manpower and other resources, which reduces the overall value available to the user by increasing the savings necessary to justify a migration.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
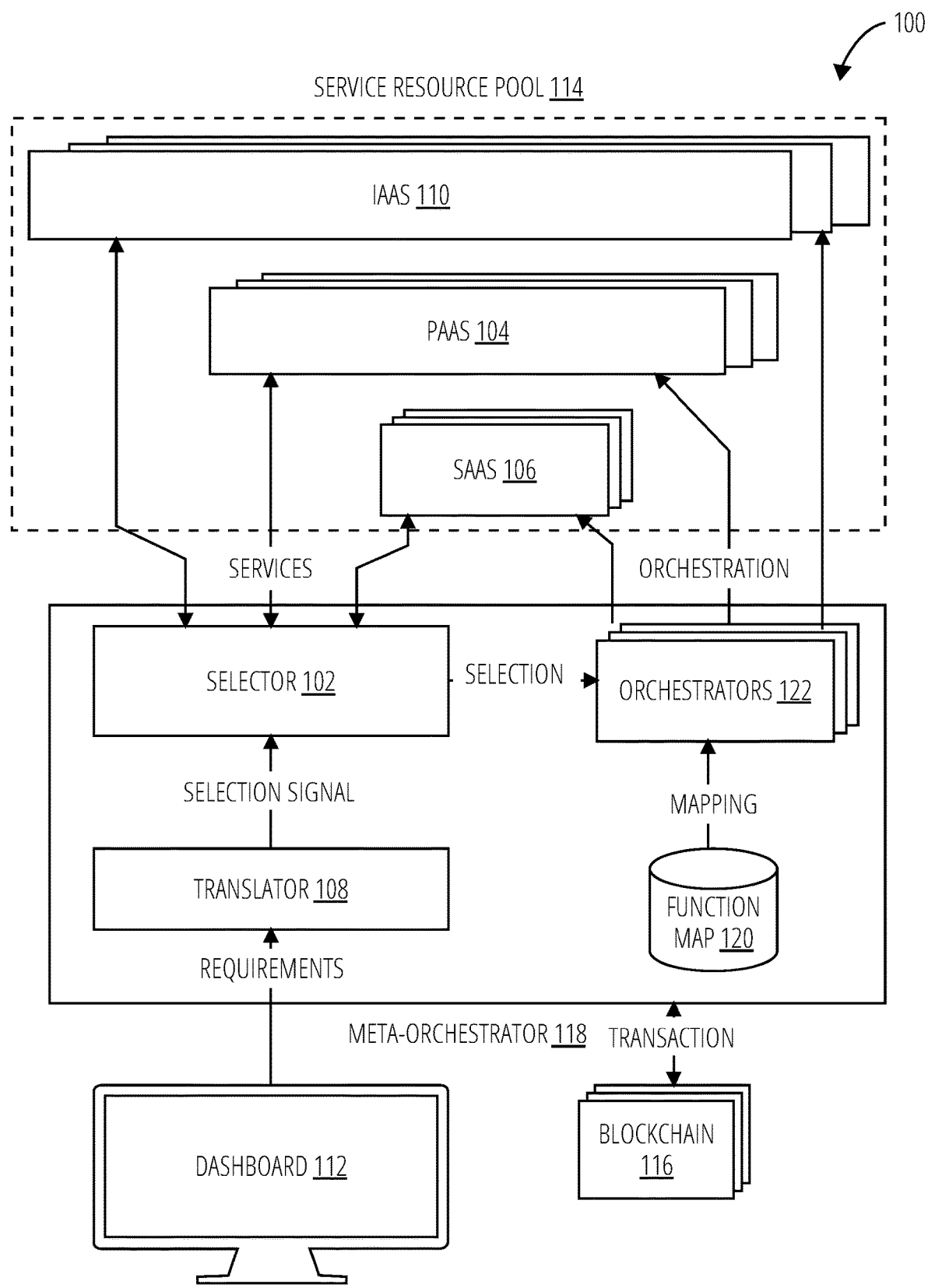
FIG. 1 illustrates an embodiment of a robotic cloud computing services arbitration system 100.

Given the increasing commodification of cloud computing resources, a higher degree of mobility and service resource pool monitoring would allow of a more efficient apportionment of cloud computing resources. These resources may be sourced from around the globe, and local differences in costs and other factors cause an increase in disparity of consumer costs between services and local service markets. Inter alia, the system and method allow for the exploitation of these differences in increasingly smaller increments and larger scales, in part by automating tasks to avoiding the resource costs that may come with the migration and/or fragmentation of data and computation across and/or between services and service levels.

The system and method allow for the robotic, and semi-robotic (computer suggested, human curated), arbitration and reapportionment of computing resources between services. The system may maintain a pool of cloud service resources, these may be available from a variety of sources, from individual service providers, to resellers or may be obtained by the resource pool for reallocation. By monitoring a large resource pool, the system and method may obtain computing resources at larger resource savings than might otherwise be possible. The system also employs a meta-orchestrator to provide for higher data mobility and migration between services to facilitate the movement of data and applications between services. Services may include, for example, software (SAAS: Software As A service), infrastructure (IAAS: Infrastructure As A service) or platform (PAAS: Platform As A service). Certain types of services for example, email services, may be thought of as existing at the PAAS level or the SAAS level, depending the service.

Orchestration is often discussed as having an inherent intelligence or even implicitly autonomic control. Orchestration is largely the effect of automation or systems deploying elements of control theory. This usage of orchestration is often discussed in the context of service-oriented architecture, virtualization, provisioning, converged infrastructure and dynamic datacenter topics. Orchestration in this sense (so called "policy-based orchestration") is about aligning the business request with the applications, data, and infrastructure. It defines the policies and service levels through automated workflows, provisioning, and change management. This creates an application-aligned infrastructure that can be scaled up or down based on the needs of each application. Policy-based orchestration also provides centralized management of the resource pool, including billing, metering, and chargeback for consumption. For example, policy-based orchestration reduces the time and effort for deploying multiple instances of a single application. And as the requirement for more resources or a new application is triggered, automated tools now may perform tasks that previously could only be done by multiple administrators operating on their individual pieces of the physical stack. A somewhat different usage relates to the process of coordinating an exchange of information through web service interactions. Applications that decouple the orchestration layer from the service layer are sometimes called agile applications. A distinction is often made between orchestration (a local view from the perspective of one participant) and choreography (coordination from a global multi-participant perspective, albeit without a central controller). In this instance, the system employs meta-orchestration allow for the orchestration of orchestrators. Just as an orchestrator may provide for the provisioning and deprovisioning of data storage and compute power on a given architecture or service depending on the demands of the system, a meta-orchestrator provides for the provisioning, deprovisioning, etc. between different services depending on client criteria. This experience may be user-mediated to allow the user to manually manage the criteria and to allow the system to make those adjustments, or the system may be pre-configured by the user and orchestrate client system changes between services on the fly. In addition to allowing for the policy-based orchestration (i.e., "cloud-hopping") between services on a given layer. The system and method may be employed, for example, to initiate provision or de-provision of an email system across multiple platforms. The system may also manage suggestions and migrations between layers. The system and method may accomplish this by employing expert systems using pattern recognition and machine learning to recognize when, how, what, where, and offer why a recommendation is made The methods to migrate must be managed by a highly available (redundant fallback using floating IP) service layer manager. The service layer manages actions on behalf of the end customer to orchestrate overlapping provisioning and deprovisioning (layer changing), activations, ACLs mapping and billing, etc. For example, the use of containers and CAAS (Container As A service) providers may allow for a system to recognize a savings if an IAAS provider combined with a CAAS provider is substituted for a PAAS provider. Compatibility may be determined between different services or between different service layers in part by an assessment of available features, languages and functions available on the service. There are different services available, and each separate type of service may have a different compatibility matrix or rating system. For example:

1. Infrastructure as a service—e.g. networking, storage, and compute compatibility and performance may be context-specific for a given architecture category. For example, # of ports, speed, TOPS, GigaFlops, etc. [ . . . ]

2. Platform as a service -application and language specific access to things like databases, email(messaging), analytics (e.g. map reduce), compatibility may be context-specific for the architecture category, for example, scale(size)APIs such as MAPI, TAPI, security layers like TLS, SSL, key-value pairs and specific language features such as JSON.

3. Software as a service—end user specific UI functionality. Any instrumentable UI via The Document object model, AJAX, object models and even screen scraping.

The system may make use of commercially available compatibility testing tools and test harnesses to make the determination of compatibility between services as well as between client systems and the available services, and machine learning may be employed to make for better future compatibility assessments based on past logged data.

For services with an internal function set which is analogous to another service, the use of a mapping layer may allow the services to interact. This mapping layer may utilize mapping functions to map functions from one provider to another provider. The system and method may provide large, taxonomical databases (for example, a noSQL database) to store the maps, and the maps may be pre-loaded and may rely on machine learning to learn about the successfulness of individual mapping functions and to better deal with change management and improve over time. The system may employ a default universal adapter and may adjust the adapter or employ multiple adapters to accomplish adapt between data. The system may also make use of a distributed database for the purpose of managing and recording events and transactions. This may utilize "blockchain" implementations commonly known within the art. This provides for a redundant, distributed, and Immutable record to help prevent fraud. Some implementations of block chain may provide storage within the bock chain structure. The system may receive client requirements and system requirements on a user interface or "dashboard." The Dashboard may show a graphical or data representation of a multi-axis graph which balances multiple possible user requirements. This may be employed as a "triple constraint" triangular diagram depicting, for example: service level, availability, and cost, facilitating the user to find the most appropriate intersection of the attributes/requirements. The user's selection of these values may be translated into resource parameters. The resource parameters may be sourced not only from the user, however, and may also be discovered by the system through testing as well as through the use of supervised and unsupervised machine learning processes.

Client system in this context refers to: the computerized system or amalgamation of data, employed across one or more network architectural tiers, that a customer may utilize a service to deploy on the cloud/internet.

Meta-orchestrator in this context refers to: logic to orchestrate orchestrators between services and service layers.

Tolerance value in this context refers to: an assigned value which indicates the point at which a system may make a switch between services at a cost savings. This may allow the system to reasonably assume the point at which the switch may be made.

Multiplexed service signal in this context refers to: combined data denoting the different available services which may meet the client system's compatibility needs.

Signal Filter in this context refers to: logic to filter a multiplexed service signal into a service selection signal by the removal of unwanted components or features, the filter may be calibrated by applying a tolerance value to the filter to change which elements are filtered out (i.e. band-pass).

Encoder in this context refers to: logic to associate input values with output with an output value, encoding the input in the output format.

Resource Parameters in this context refer to: client requirements beyond strict system requirements, i.e. business requirements, for example, system agility and cost.

Client system requirements in this context refers to: the requirements of a client system based on system specifications and compatibility. For example, processing speed, storage, functions, etc.

Virtual interface in this context refers to: a universal data connector/adapter or mapping layer which connects the client system to the required inputs and outputs on a service, for example, this may be a virtual machine, a simple function mapper, and/or a container.

Integrity verification data in this context refers to: information utilized to verify the integrity of data, for example, an encrypted or unencrypted copy of the data, metadata, or a checksum.

Referencing FIG. 1, the robotic cloud computing services arbitration system 100 comprises service resource pool 114, a meta-orchestrator 118, a dashboard 112, and a blockchain 116. The meta-orchestrator 118 further comprises a translator 108, orchestrators 122, selector 102, and a function map 120.

The service resource pool 114 further comprises a PAAS 104, a SAAS 106, and an IAAS 110.

The meta-orchestrator 118 receives requirements from the dashboard 112 and the translator 108 translates the requirements into a selection signal and transmits the selection signal to the selector 102. The selector 102 selects the IAAS 110, the PAAS 104 or the SAAS 106 from the service resource pool 114, selecting the service based on the selection signal. The selection is transmitted to the dashboard 112 and the meta-orchestrator 118 manages the transition between the previous IAAS 110, PAAS 104, or SAAS 106 to the new PAAS 104, SAAS 106 Or IAAS 110. The meta-orchestrator 118 utilizes a function map 120 to allow the orchestrators 122 to adapt current data and system requirements to the new service. The meta-orchestrator 118 records the transaction in the blockchain 116.

Figure 2:
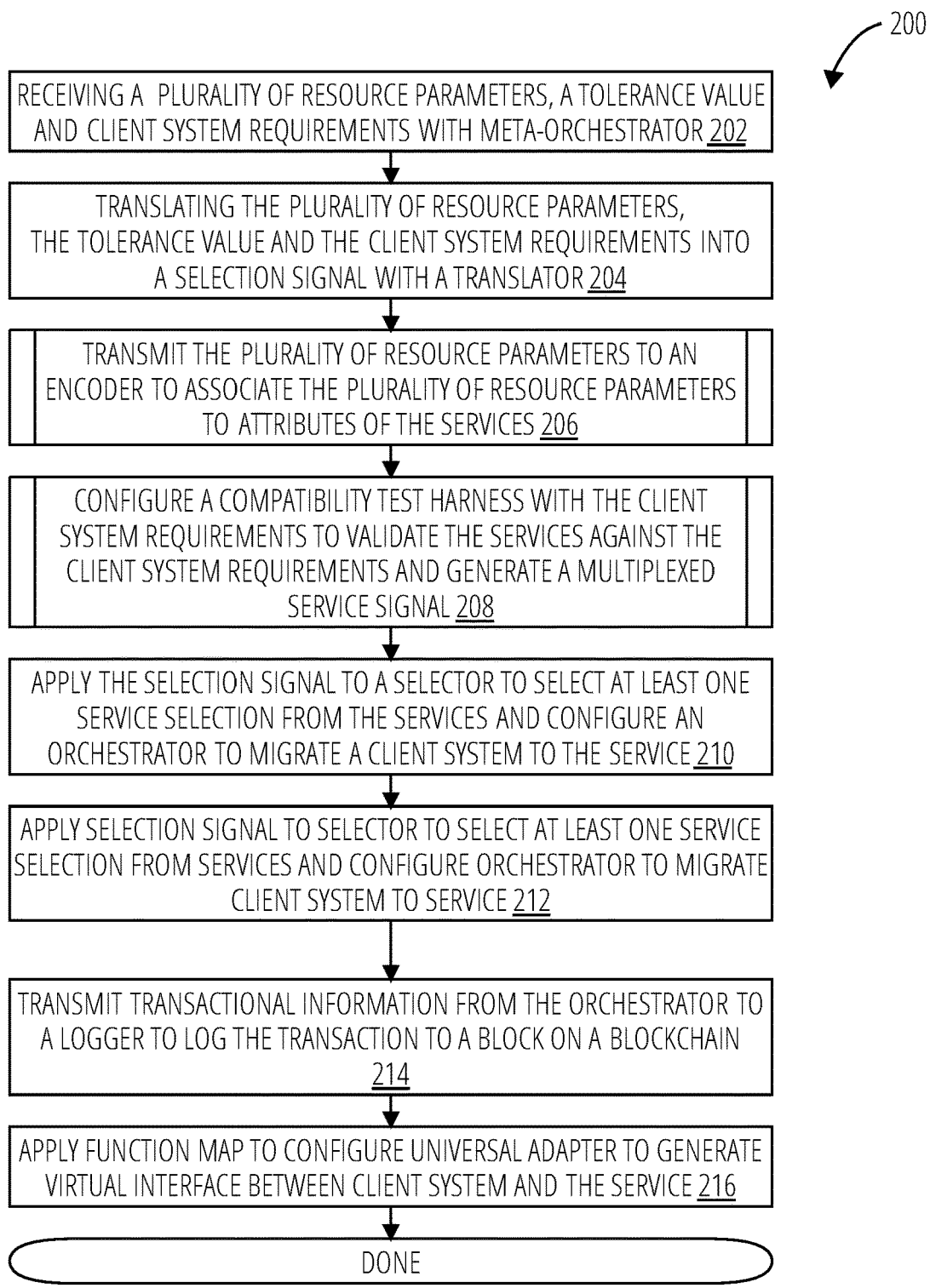
FIG. 2 illustrates an embodiment of a process for robotically arbitrating cloud computing services 200.

The robotic cloud computing services arbitration system 100 may be operated in accordance with the process outlined in FIG. 2.

Referencing FIG. 2, the process for robotically arbitrating cloud computing services 200 receives a plurality of resource parameters, a tolerance value and client system requirements with meta-orchestrator. (block 202)

Translate the plurality of resource parameters, the tolerance value and the client system requirements into a selection signal with a translator. (subroutine block 206)

Transmit the plurality of resource parameters to an encoder to associate the plurality of resource parameters to attributes of the services. (subroutine block 208)

Configure a compatibility test harness with the client system requirements to validate the services against the client system requirements and generate a multiplexed service signal. (block 210)

Apply the tolerance value to a signal filter to filter the multiplexed service signal into the selection signal. (block 212)

Apply the selection signal to a selector to select at least one service selection from the services and configure a meta-orchestrator to migrate a client system to a different service. (block 214)

Transmit transactional information to a logger to log the transaction to a block on a blockchain. (block 214)

Apply a function map to configure a universal adapter to generate a virtual interface between the client system and the service. (block 216)

A method for robotically arbitrating cloud computing services may include receiving a group of resource parameters, a tolerance value and client system requirements with a meta-orchestrator, which may translate the group of resource parameters, the tolerance value and the client system requirements into a selection signal with a translator. The group of resource parameters is transmitted to an encoder to associate the group of resource parameters to attributes of the services.

A compatibility test harness may be configured with the client system requirements to validate the services against the client system requirements and generate a multiplexed service signal. The tolerance value is transmitted to a signal filter to filter the multiplexed service signal into the selection signal.

The translator may apply the selection signal to a selector to select at least one service from a service resource pool and configure a meta-orchestrator to migrate a client system to the service. The meta-orchestrator transmits transactional information to a logger to log the transaction to a block on a blockchain, and applies a function map to configure a universal adapter to generate a virtual interface between the client system and the service.

The selection signal may be alternatively routed to a user interface and the user interface is controlled to generate a manual control signal to operate the orchestrator. The group of resource parameters, and the tolerance value may be received from a user interface. Machine learning may be applied to the translator and the compatibility test harness to generate the selection signal. The virtual interface may further include a mapping layer. A mapping function may be applied to connect the client system to the service.

Figure 3:
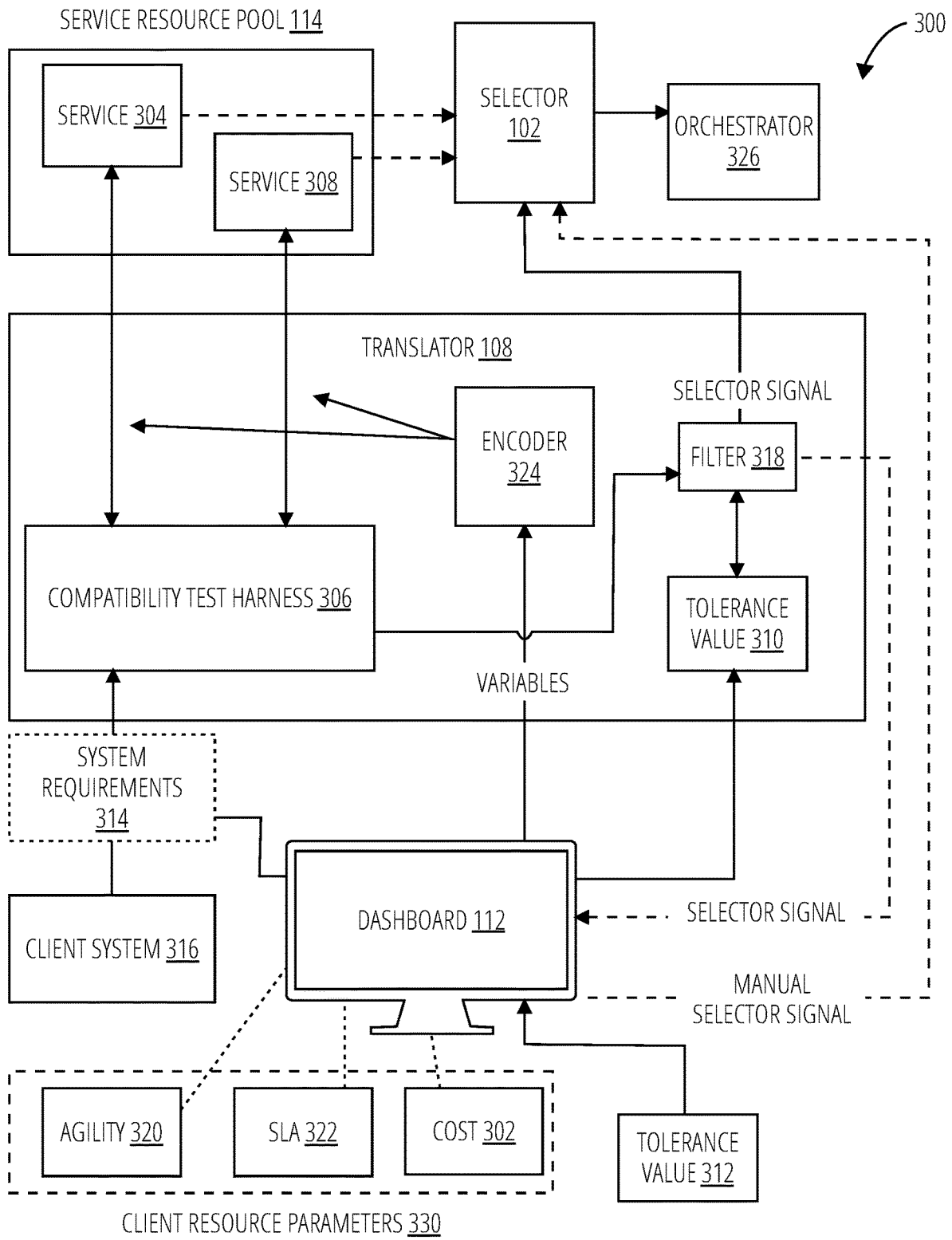
FIG. 3 illustrates an aspect of a robotic cloud computing services arbitration system 300 in accordance with one embodiment.

Referencing FIG. 3, the robotic cloud computing services arbitration system 300 comprises a selector 102, a translator 108, a dashboard 112, a tolerance value 310, a tolerance value 312, a system requirements 314, a client system 316, service resource pool 114, a client resource parameters 330 and an orchestrator 326.

The translator 108 further comprises a compatibility test harness 306, a filter 318, and an encoder 324.

The service resource pool 114 further comprises the service 304 and the service 308.

The client resource parameters 330 further comprises a cost 302, an agility 320, and an SLA 322.

The dashboard 112 receives selections of agility 320, SLA 322 (Service Level Agreement requirements), cost 302, and tolerance value 312 and transforms the agility 320, the SLA 322 and the cost 302 into variables and transmits the variables to the encoder 324. The encoder 324 encodes the variables as attributes associated with attributes belonging to the service 304 and the service 308. The compatibility test harness 306 tests the service 308 and the service 304 against the system requirements 314. The system requirements 314 may be provided by the client system 316 or the dashboard 112. The compatibility test harness 306 transmits a multiplexed service signal to the selector 102 via the filter 318. The dashboard 112 applies the tolerance value 310 to the filter 318 and the filter 318 filters the multiplexed service signal into a selector signal to operate the selector 102 and select at least one of the service 304 and the service 308 and transmit them to the orchestrator 326. The translator may return the service selection signal to the dashboard 112, configuring the dashboard 112 to display service options and allowing the user to make a manual selection. The dashboard 112 may then send an overridden selector signal to the selector 102 to select at least one of the service 304 and the service 308 to transmit the service selections to the orchestrator 326 to be implemented.

The robotic cloud computing services arbitration system 300 may be operated in accordance with the process outlined in FIG. 2.

Figure 4:
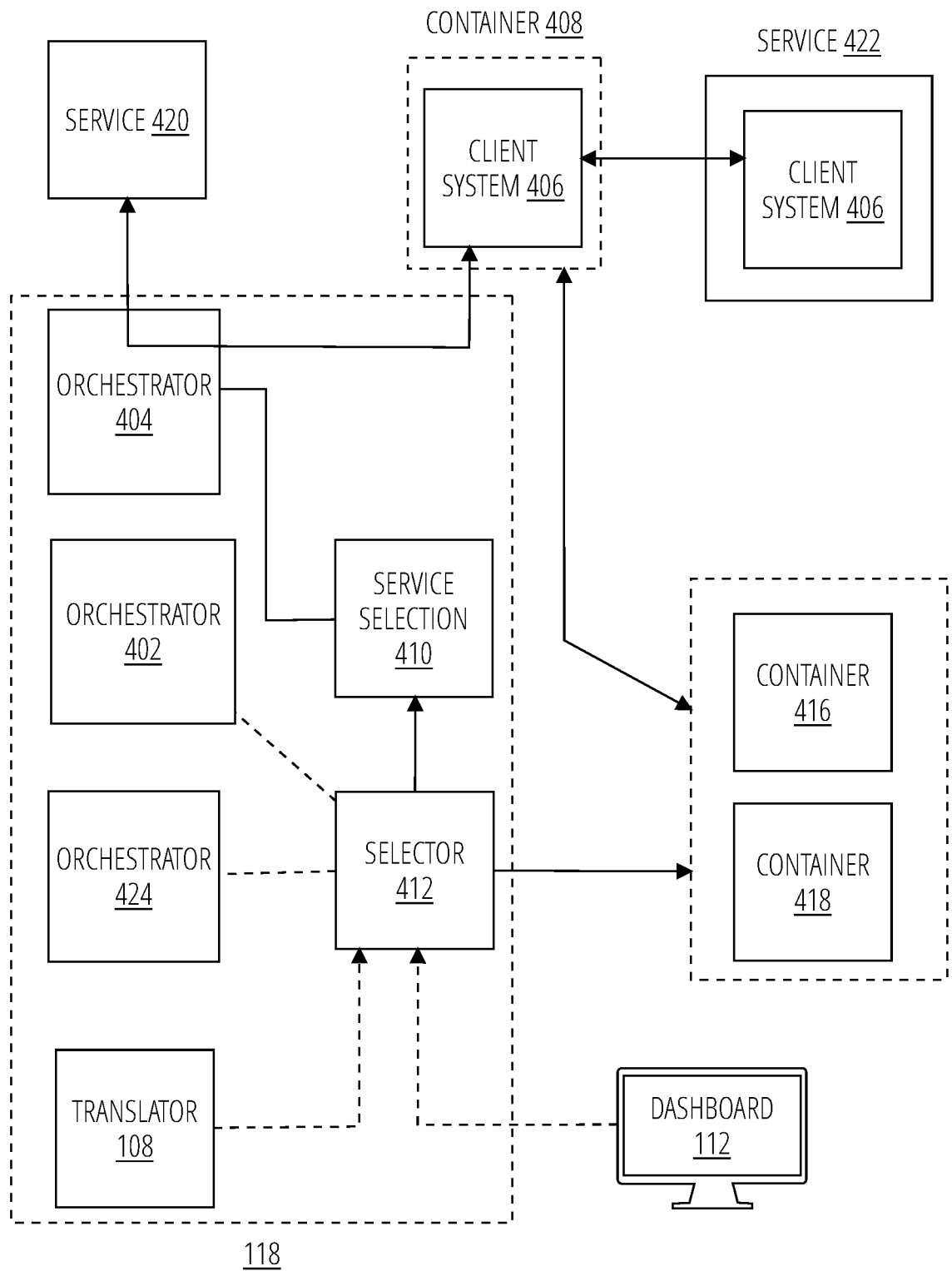
FIG. 4 illustrates an aspect of a robotic cloud computing services arbitration system 400 in accordance with one embodiment.
Figure 5:
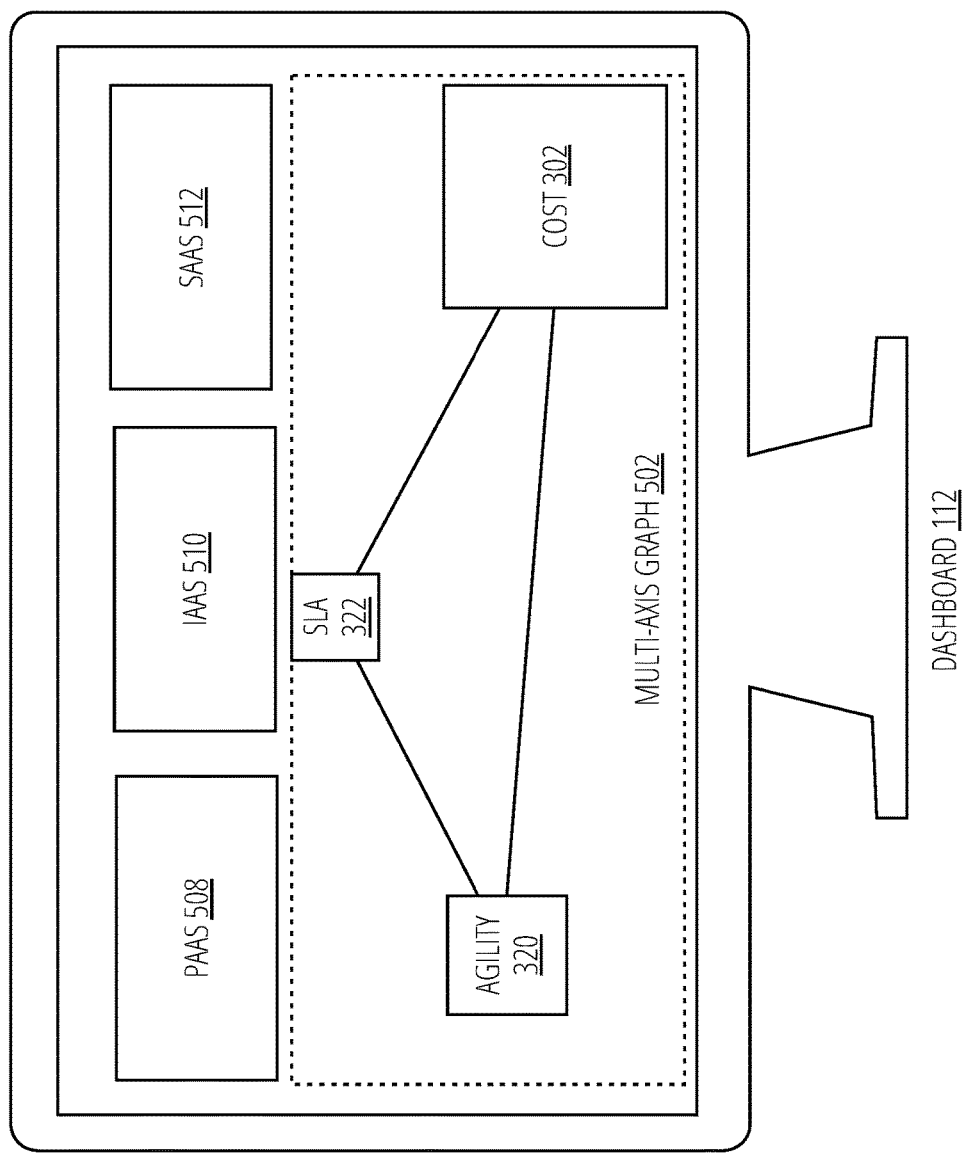
FIG. 5 illustrates an aspect of a robotic cloud computing services arbitration system 500 in accordance with one embodiment.
Figure 6:
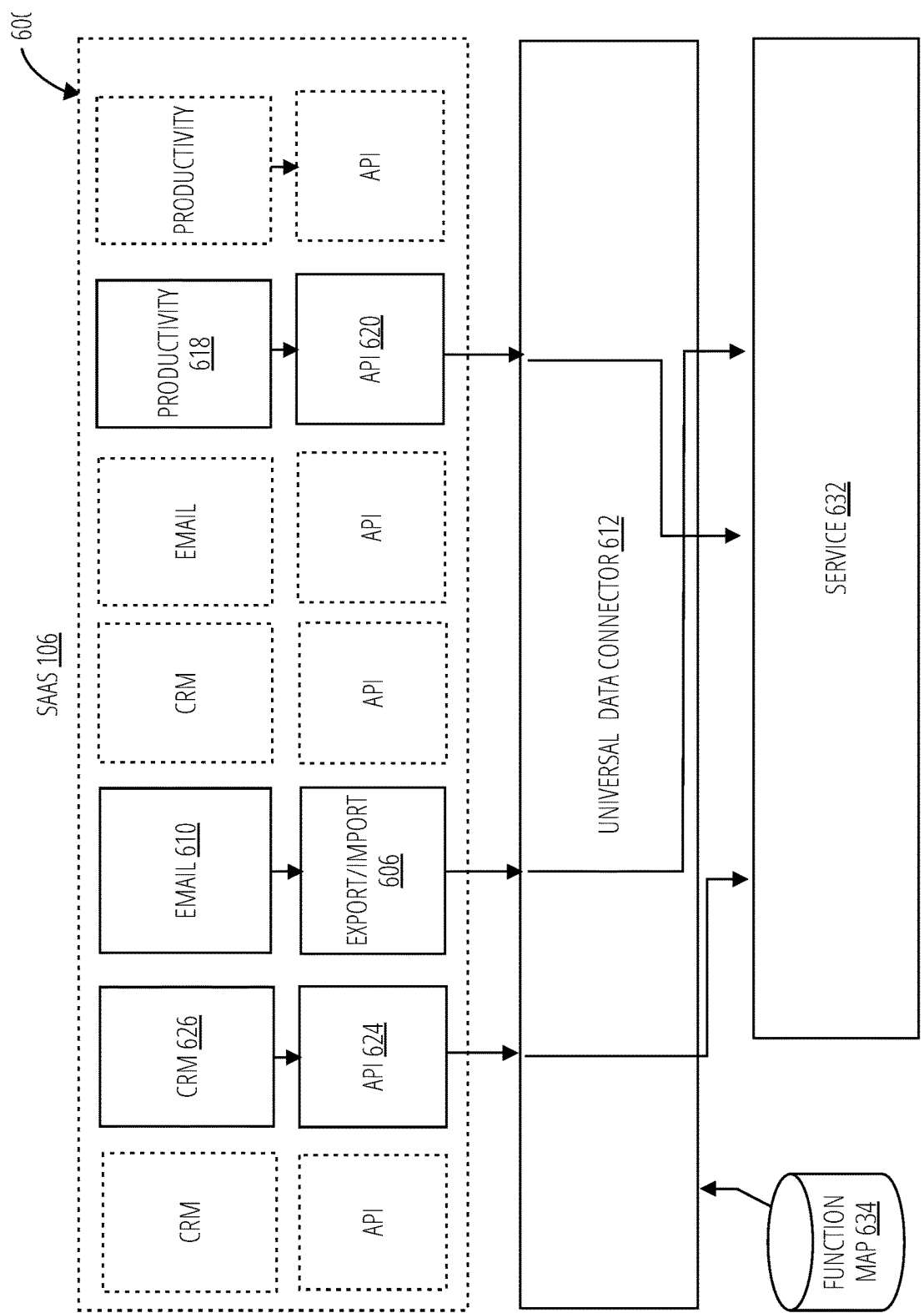
FIG. 6 illustrates an aspect of a robotic cloud computing services arbitration system 600 in accordance with one embodiment.
Figure 7:
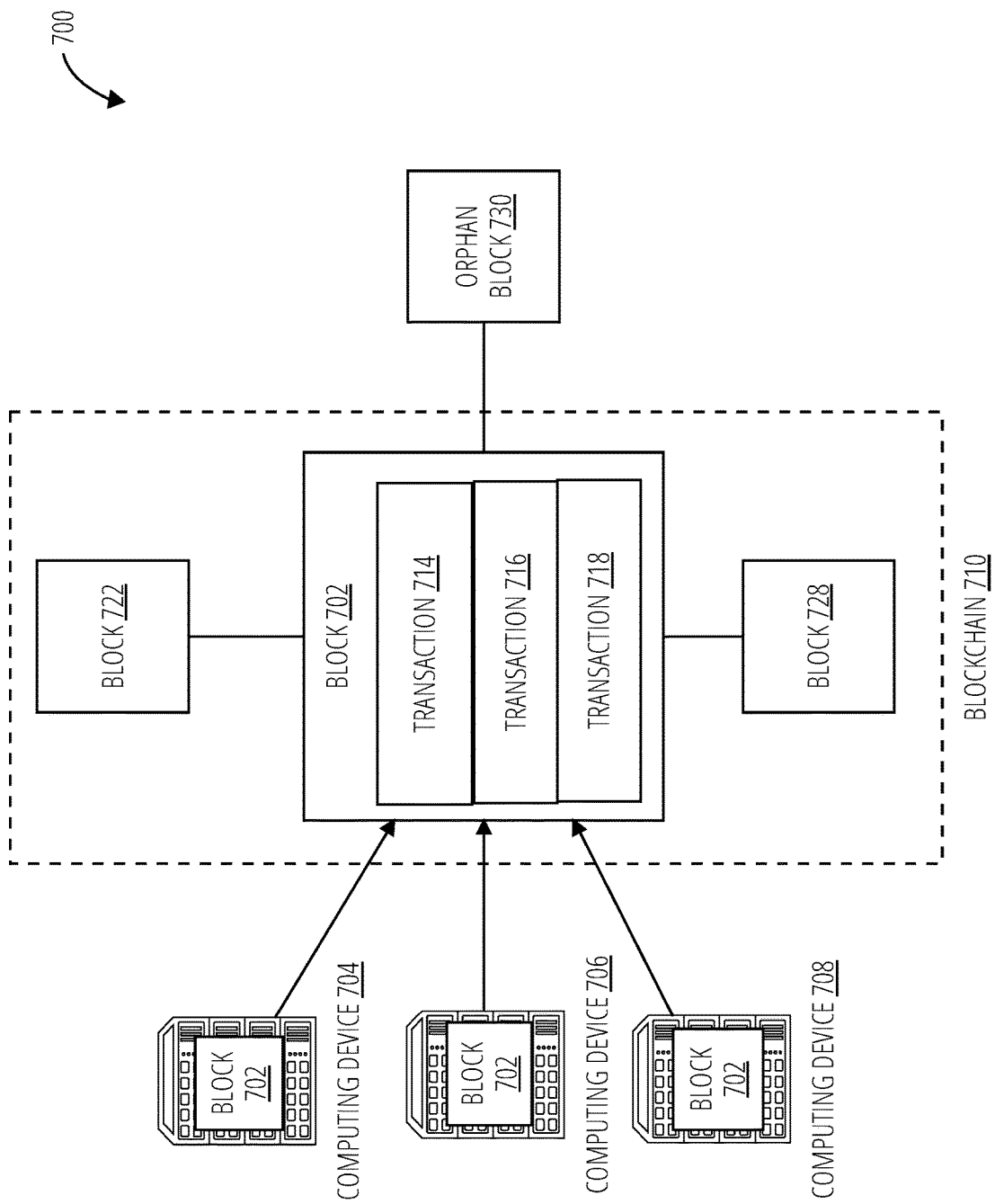
FIG. 7 illustrates an aspect of a robotic cloud computing services arbitration system 700 in accordance with one embodiment.

Referencing FIG. 4 the robotic cloud computing services arbitration system 400 comprises an orchestrator 402, an orchestrator 404, a client system 406, a container 408, a client system 406, a selector 412, a dashboard 112, a container 416, a container 418, a service 420, a service 422, and an orchestrator 424.

The selector 412 receives a selector signal from the translator 108 or a manual selector signal from the dashboard 112. The selector 412 transmits a service selection 410 indicating the selection of the service 420 and the container 408 to the meta-orchestrator 404 to transfer the client system 406 from the service 422 to the service 420. The selector 412 may cause the meta-orchestrator 118 to switch between use of the orchestrator 404, the orchestrator 402, and the orchestrator 424 depending on the service selected by the selection signals.

The robotic cloud computing services arbitration system 400 may be operated in accordance with the process outlined in FIG. 2.

The robotic cloud computing services arbitration system 500 comprises a dashboard 112.

The dashboard 112 further comprises the PAAS 508, the IAAS 510, the SAAS 512 and the multi-axis graph 502.

The multi-axis graph 502 further comprises the SLA 322, the cost 302, and the agility 320.

The dashboard 112 shows a graphical representation of available services the PAAS 508, the IAAS 510, and the SAAS 512, and possible client requirements, the SLA 322, the cost 302, the agility 320. The SLA 322, the agility 320, the cost 302 may be displayed on a multi-axis graph 502 on the dashboard 112. Importance may be shown by a visual representation of location of a particular requirement relative to others or a fixed point on the multi-axis graph 502. The objects on the multi-axis graph 502 may represent particular service requirements, for example connectivity, quality, availability.

The robotic cloud computing services arbitration system 500 may be operated in accordance with the process outlined in FIG. 2.

The robotic cloud computing services arbitration system 600 comprises a SAAS 106, universal data connector 612, and a function map 634.

The SAAS 106 further comprises an export/import 606, an Email 610, a productivity 618, an application program interface (API) 620, an API 624, a CRM 626, and a service 632.

The export/import 606 may receive the Email 610 and the universal data connector 612 applies the function map 634 to map the export/import 606 to the service 632.

The API 620 interfaces with the application for productivity 618 and the universal data connector 612 applies the function map 634 to map the API 620 to the service 632.

The API 624 may read from the CRM 626 and the universal data connector 612 applies the function map 634 to map the API 624 to the service 632.

The robotic cloud computing services arbitration system 600 may be operated in accordance with the process outlined in FIG. 2.

The robotic cloud computing services arbitration system 700 comprises a block 702, a computing device 704, a computing device 706, a computing device 708, a blockchain 710, orphan block 730.

The blockchain 710 further comprises a block 702, a block 722, and a block 728.

The block 702 further comprises a transaction 714, a transaction 716, and a transaction 718.

Through the use of a peer-to-peer network and a distributed timestamping server, a blockchain database may hold batches of valid transactions, such as the transaction 714, the transaction 716, and the transaction 718 which may be hashed and encoded into a Merkle tree. Each block includes the hash of the prior block in the blockchain, linking the two. The block 728 is linked to the block 702 and the block 702 is linked to the block 722. The computing device 708, the computing device 706, and the computing device 708 may employ known blockchain block validation methods to validate the block 702. The computing device 708 or the computing device 706 may override the validation of a block by the computing device 704 in which case the orphan block 730 would not link to any further block, and transactions ascribed on that block may be considered invalid.

Figure 8:
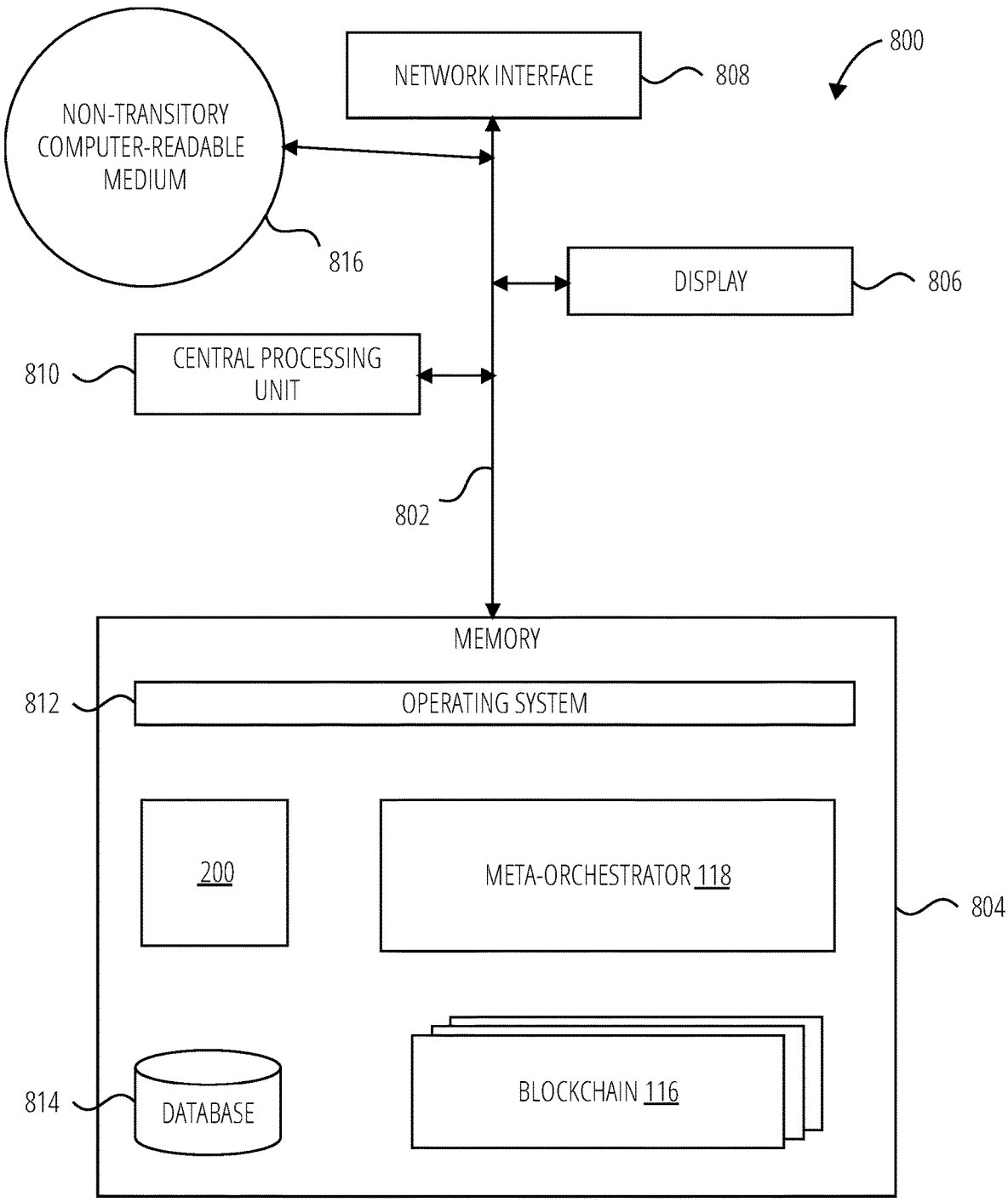
FIG. 8 illustrates a system 800 in accordance with one embodiment.

FIG. 8 illustrates several components of an exemplary system 800 in accordance with one embodiment, which may be configured as the computing apparatus disclosed herein. In various embodiments, system 800 may include a desktop PC, server, workstation, mobile phone, laptop, tablet, set-top box, appliance, or other computing device that is capable of performing operations such as those described herein. In some embodiments, system 800 may include many more components than those shown in FIG. 8. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 800 may comprise one or more physical and/or logical devices that collectively provide the functionalities described herein. In some embodiments, system 800 may comprise one or more replicated and/or distributed physical or logical devices.

In some embodiments, system 800 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 800 includes a bus 802 interconnecting several components including a network interface 808, a display 806, a central processing unit 810, and a memory 804.

Memory 804 generally comprises a random access memory ("RAM") and permanent non-transitory mass storage device, such as a hard disk drive or solid-state drive. Memory 804 stores an operating system 812.

These and other software components may be loaded into memory 804 of system 800 using a drive mechanism (not shown) associated with a non-transitory computer-readable medium 816, such as a DVD/CD-ROM drive, memory card, network download, or the like.

Memory 804 also includes database 814. In some embodiments, system 800 may communicate with database 814 via network interface 808, a storage area network ("SAN"), a high-speed serial bus, and/or via the other suitable communication technology.

In some embodiments, database 814 may comprise one or more storage resources provisioned from a "cloud storage" provider, for example, Amazon Simple Storage service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A non-transitory machine-readable media comprising instructions that, when executed by a machine data processor, result in:
   instantiation of a meta-orchestrator for arbitrating cloud computing services, the meta-orchestrator comprising:
   a plurality of orchestrators, each orchestrator providing provisioning and deprovisioning of data storage and compute power on a corresponding service based on resource requirements of a client system;
   a translator to transform a plurality of resource parameters, a tolerance value, and client system resource requirements into a selection signal, the translator configured to:
      transmit the plurality of resource parameters to an encoder to associate the plurality of resource parameters to attributes of services in a service resource pool;
      configure a compatibility test harness with the client system resource requirements to validate the services against the client system resource requirements and generate a multiplexed service signal; and
      apply the tolerance value to a signal filter to filter the multiplexed service signal into the selection signal;
   instantiation of a selector responsive to the selection signal to select at least one service from the service resource pool and to migrate data and applications of a client system from a first service to a second, different service, the first service managed by a first orchestrator of the plurality of orchestrators and the second service managed by a second, different orchestrator of the plurality of orchestrators;
   the meta-orchestrator configured to deactivate the first orchestrator and to activate the second orchestrator in response to the selection signal; and
   the meta-orchestrator configured to apply a function map to configure a universal adapter as a container of the client system, to generate a virtual interface between the client system and the second service via the second orchestrator.

2. The non-transitory machine-readable media of claim 1, wherein the second service comprises an infrastructure as a service, a platform as a service, and a software as a service, and the multiplexed service signal is based on a compatibility matrix between the client system resource requirements.

3. The non-transitory machine-readable media of claim 1, further comprising instructions that, when executed by the machine data processor, result in:
   adapting a default universal adaptor for use with the second service based upon the function map and results of applying the function map to the second service.

4. The non-transitory machine-readable media of claim 1, further comprising instructions that, when executed by the machine data processor, result in:
   routing the selection signal to a user interface wherein the user interface is operable to generate a manual override signal to operate the meta-orchestrator.

5. The non-transitory machine-readable media of claim 1, further comprising instructions that, when executed by the machine data processor, result in:
   applying machine learning to discover at least one of the plurality of client resource parameters from the client system.

6. The non-transitory machine-readable media of claim 1, further comprising instructions that, when executed by the machine data processor, result in:
   applying machine learning to the translator and the compatibility test harness to generate the selection signal.

7. The non-transitory machine-readable media of claim 1, further comprising instructions that, when executed by the machine data processor, result in:
   logging integrity verification data to a blockchain.

8. A non-transitory machine-readable media comprising instructions that, when executed by a machine data processor of a computer system, cause the computer system to:
   instantiate a meta-orchestrator for arbitrating cloud computing services, the meta-orchestrator comprising:
   a plurality of orchestrators, each orchestrator providing provisioning and deprovisioning of data storage and compute power on a corresponding service based on resource requirements of a client system;
   a translator to transform a plurality of resource parameters, a tolerance value, and client system resource requirements into a selection signal, the translator configured to:
      transmit the plurality of resource parameters to an encoder to associate the plurality of resource parameters to attributes of services in a service resource pool;
      configure a compatibility test harness with the client system resource requirements to validate the services against the client system resource requirements and generate a multiplexed service signal; and
      apply the tolerance value to a signal filter to filter the multiplexed service signal into the selection signal;
   instantiate a selector responsive to the selection signal to select at least one service from the service resource pool and to migrate data and applications of a client system from a first service to a second, different service, the first service managed by a first orchestrator of the plurality of orchestrators and the second service managed by a second, different orchestrator of the plurality of orchestrators;
   each of the first service and second service comprising an infrastructure as a service, a platform as a service, and a software as a service;
   the meta-orchestrator configured to deactivate the first orchestrator and to activate the second orchestrator in response to the selection signal; and
   the meta-orchestrator configured to apply machine learning to adapt a function map of a universal adapter as a container of the client system, to generate a virtual interface between the client system and the second service via the second orchestrator.

9. The non-transitory machine-readable media of claim 8, further comprising instructions that, when executed by the machine data processor, cause the computer system to:
   route the selection signal to a user interface to generate a manual override signal to operate the meta-orchestrator.

10. The non-transitory machine-readable media of claim 8, further comprising instructions that, when executed by the machine data processor, cause the computer system to:
    apply machine learning logic to discover at least one of the plurality of client resource parameters from the client system.

11. The non-transitory machine-readable media of claim 8, further comprising instructions that, when executed by the machine data processor, cause the computer system to:
    apply machine learning to the translator and the compatibility test harness to generate the selection signal.

12. The non-transitory machine-readable media of claim 8, further comprising instructions that, when executed by the machine data processor, cause the computer system to:
 record integrity verification data to a blockchain.

* * * * *